Jan. 20, 1931.  C. B. COMSTOCK  1,789,378
BAKER'S OVEN
Filed April 6, 1927  4 Sheets-Sheet 2
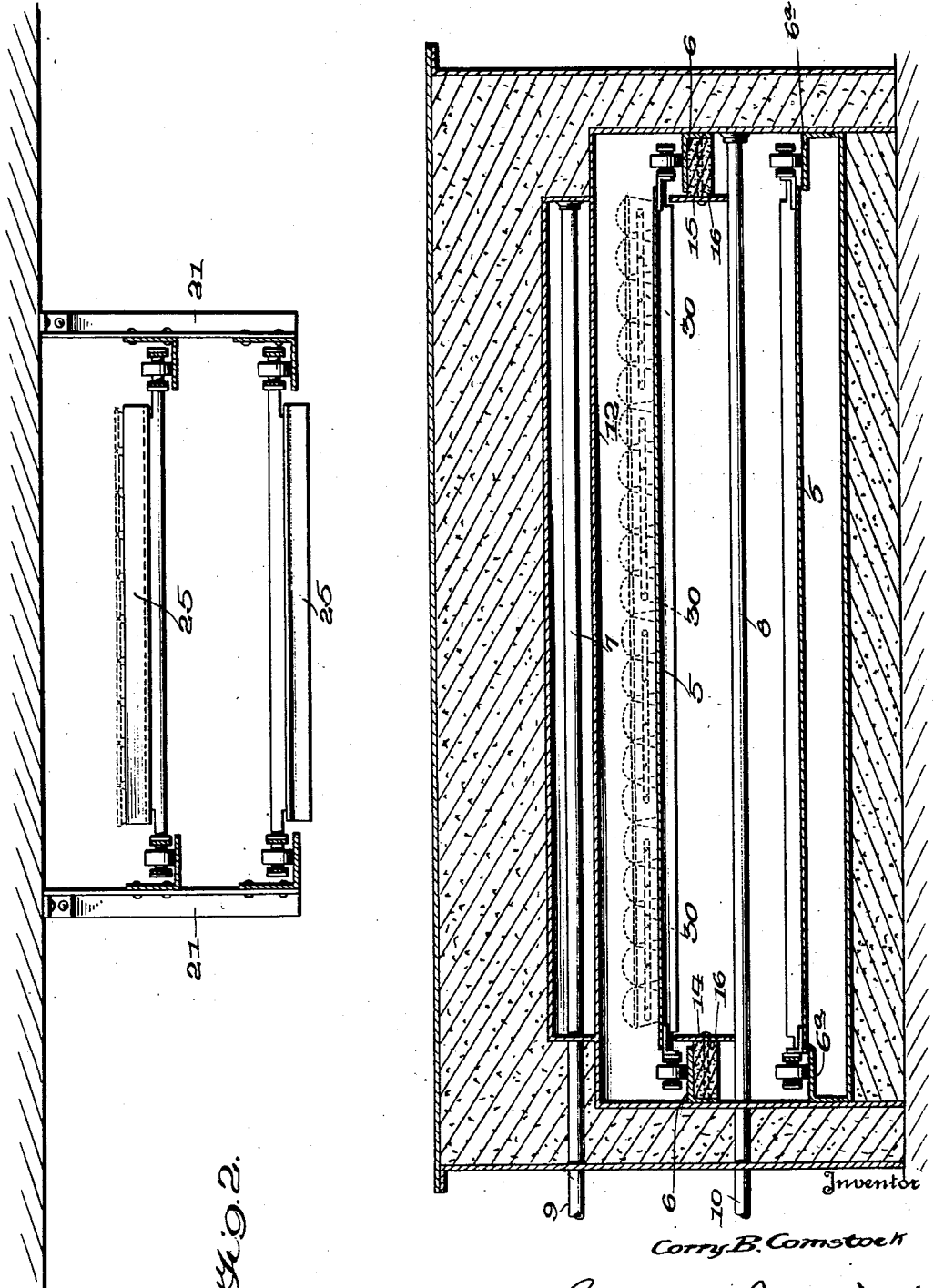

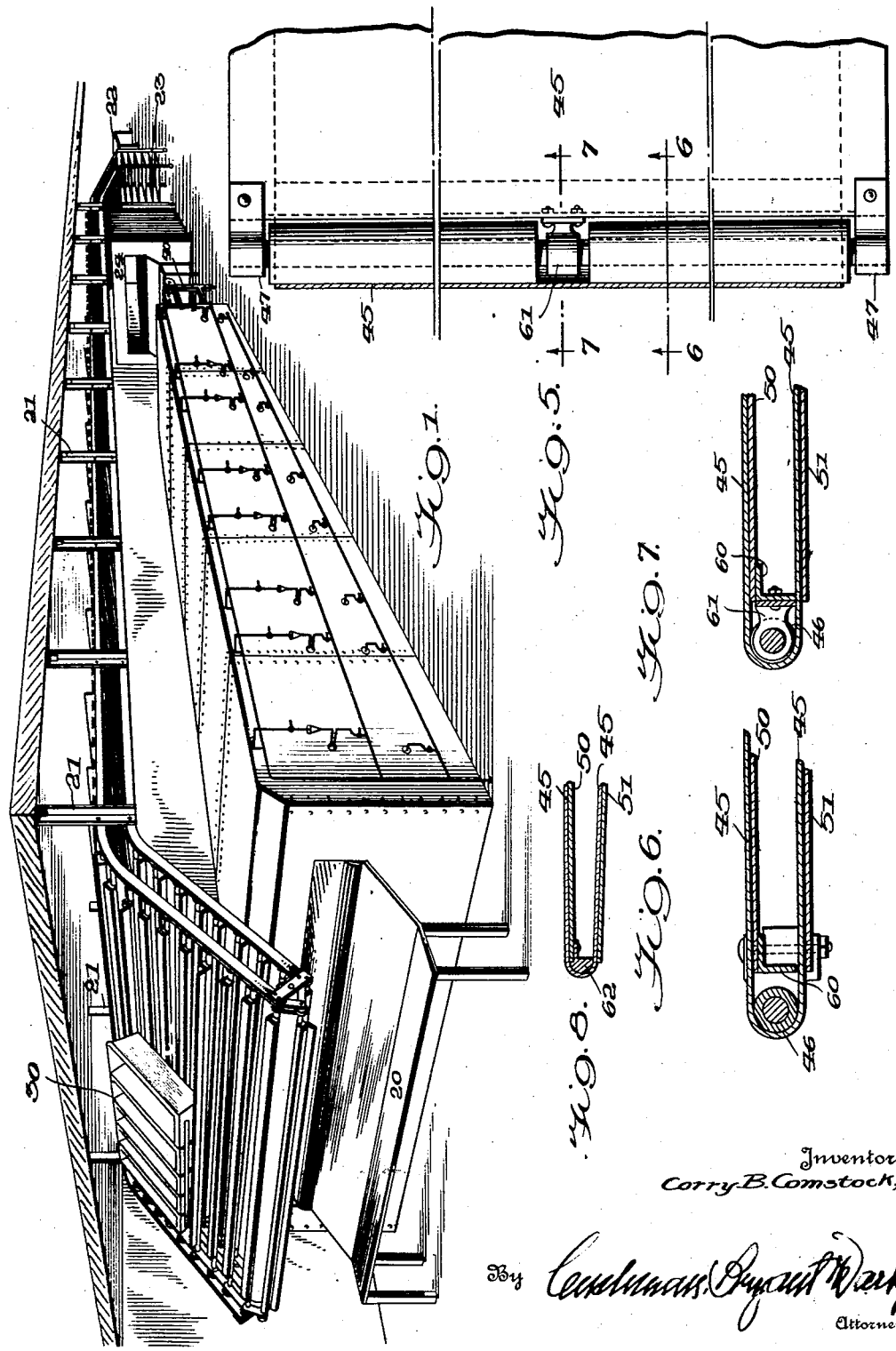

Jan. 20, 1931.  C. B. COMSTOCK  1,789,378
BAKER'S OVEN
Filed April 6, 1927  4 Sheets-Sheet 3
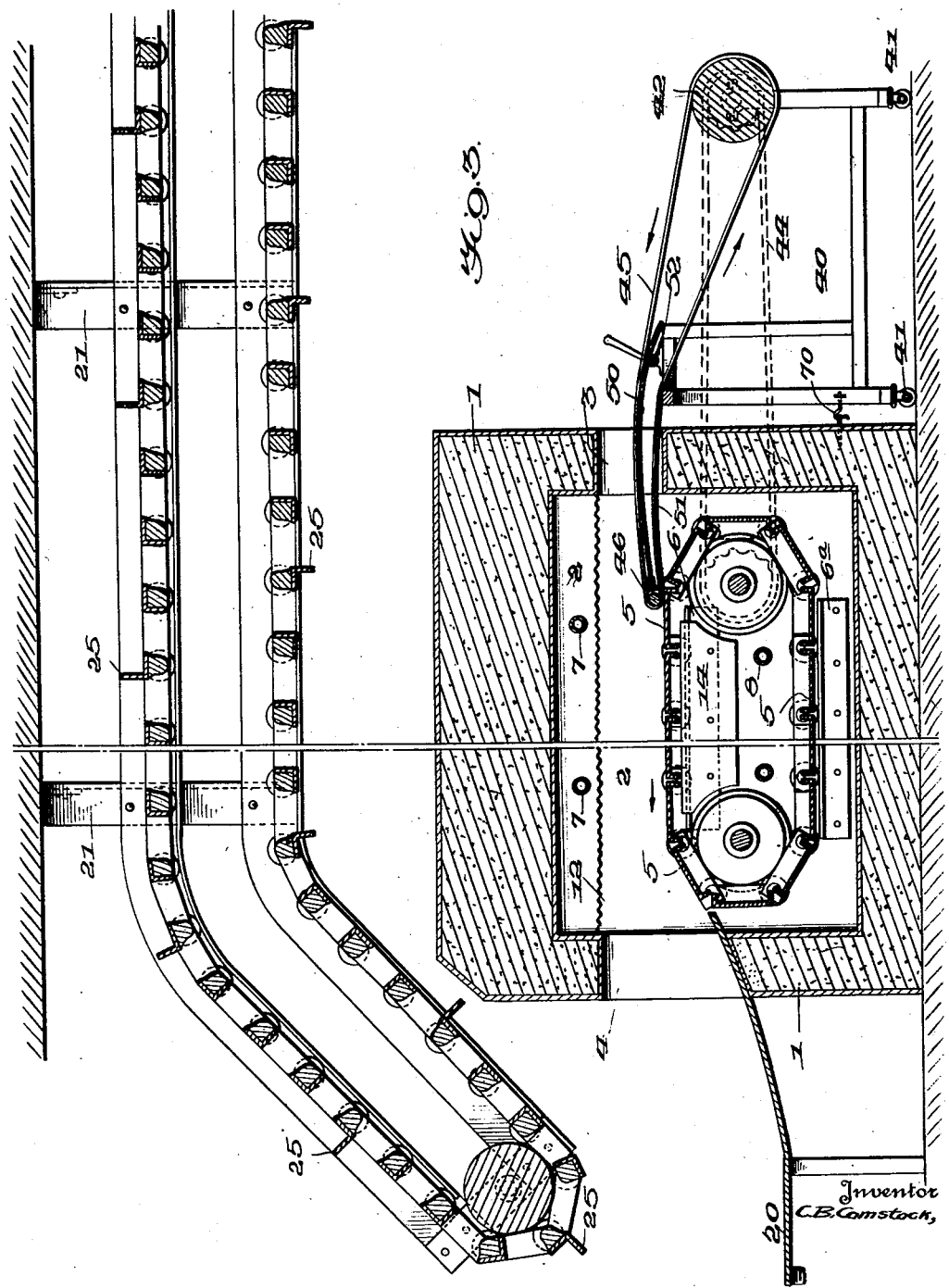

Jan. 20, 1931. C. B. COMSTOCK 1,789,378
BAKER'S OVEN
Filed April 6, 1927 4 Sheets-Sheet 4
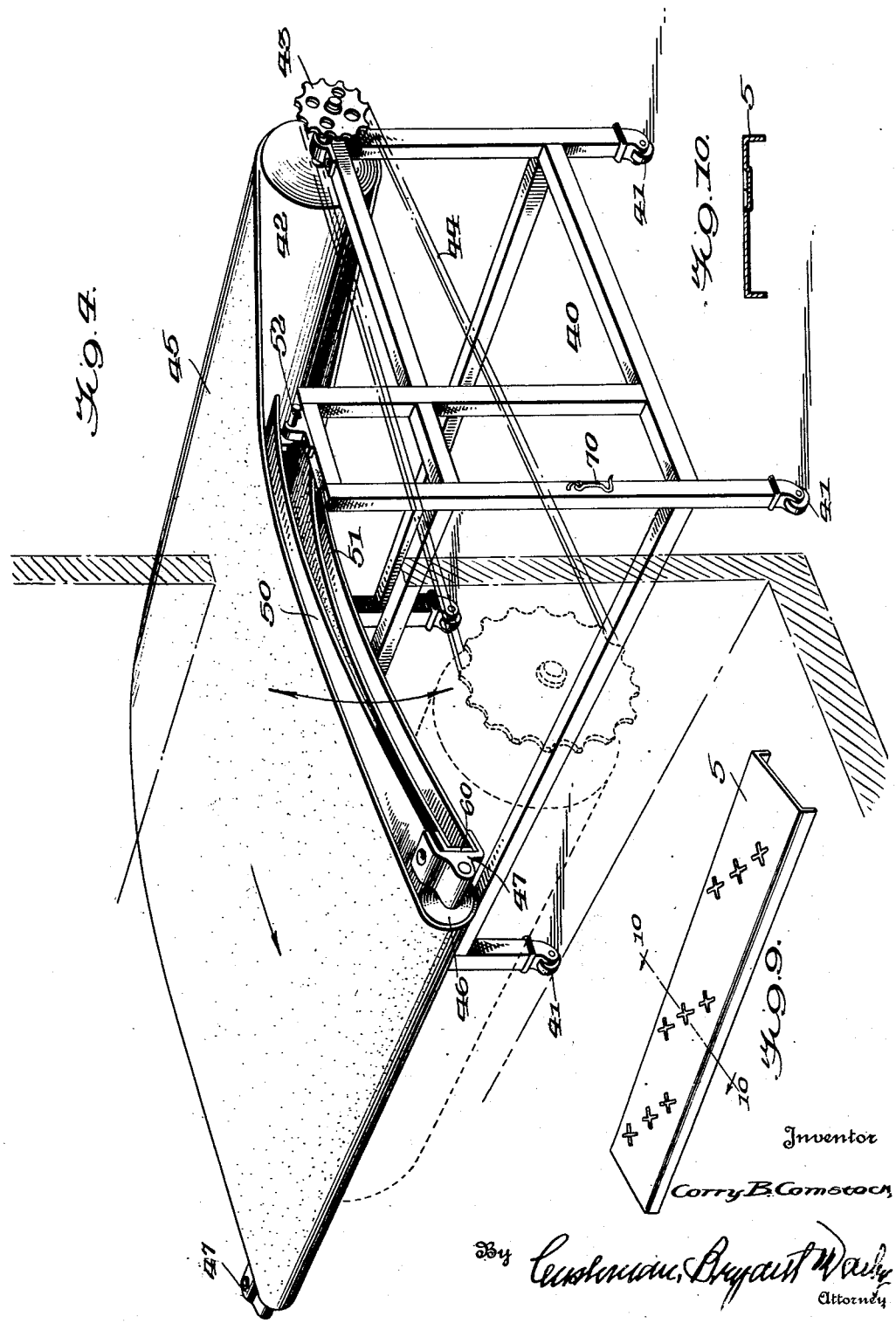

Patented Jan. 20, 1931

1,789,378

UNITED STATES PATENT OFFICE

CORRY B. COMSTOCK, OF NEW YORK, N. Y., ASSIGNOR TO COMSTOCK OVEN COMPANY, INC., OF NEW YORK, N. Y., A CORPORATION OF NEW YORK

BAKER'S OVEN

Application filed April 6, 1927. Serial No. 181,525.

The present invention relates to improvements in bakers' ovens, particularly of the type in which the walls of the baking chamber are formed of metal plates and in which an endless conveyor is provided for transporting the articles being baked through the baking chamber between inlet and outlet openings positioned in the end walls.

Among the objects of the invention is to provide means by which the pans, in which loaves of bread, for example, have been baked, may be expeditiously returned after being emptied to a point relatively adjacent the receiving end of the oven to be refilled.

By the present invention a conveying means for this purpose is arranged in such relation to the oven structure that the emptied pans may be readily positioned thereon and said means will not occupy any materially greater floor space than the oven.

A further object of the invention is to provide means whereby articles positioned adjacent the side edges of the conveyor in the baking chamber will not be subjected to materially greater heat than the articles positioned intermediate thereof. Many prior constructions of bakers' ovens of the type to which the present invention relates have been found to be objectionable because the heat of the heating elements arranged below the operative run of the conveyor had free access to the articles on such conveyor along the side edges of the latter and further, owing to heat reflected from the walls of the baking chamber, the articles positioned adjacent the side edges of the conveyor were subjected to additional heat, frequently resulting in burning or producing an undesirably heavy crust upon the said articles.

By the present invention means are provided whereby all of a series of articles extending transversely of the oven conveyor are subjected to a substantially uniform heating.

Another object of the present invention is to provide a simple and effective means for supplying articles to be baked to the baking chamber, this being particularly designed for use in baking "bottom bread".

With the foregoing and other ends in view, the invention resides in the construction and arrangement of parts that will be hereinafter more particularly pointed out and described, reference being had to the accompanying drawings in which, Figure 1 is a perspective view of a baker's oven constructed in accordance with the present invention.

Figure 2 is a transverse vertical section of the construction shown in Figure 1.

Figure 3 is a longitudinal vertical section, of the end sections of the oven of Figures 1 and 2, the intermediate sections being broken away.

Figure 4 is a perspective view of the means provided for feeding articles to the conveyor within the baking chamber.

Figure 5 is a plan and partial section of the delivery end of said feeding attachment.

Figure 6 is a section substantially on the line 6—6 of Figure 5.

Figure 7 is a similar view substantially on the line 7—7 of Figure 5.

Figure 8 is a detail of a slight modification.

Figure 9 is a detail of a portion of a flight of the oven conveyor, and

Figure 10 is a section on line 10—10 of Figure 9.

Referring to the drawings, in the several figures of which corresponding parts are designated by like reference characters, the oven illustrated is formed of metal walls preferably of double form with an intermediate lining 1 of any suitable heat insulating material.

There is thus provided a baking chamber 2 which is provided at its opposite ends with an inlet 3 and outlet 4.

Within the chamber 2 is arranged an endless conveyor adapted to transport articles being baked from adjacent the inlet 3 to the outlet 4.

As shown this conveyor consists of a series of metal flights 5, shown as being of channel form in cross section, said flights being supported by suitable chains having rollers which travel on superposed track rails 6, 6ª supported from the side walls of the baking chamber.

The article supporting surface of the flights of the oven conveyor are provided with means for marking loaves of "bottom bread" during the baking operation. This means, as shown, particularly in Figure 9, comprises suitable indented characters formed in the body of the flight into which portions of the bottoms of the loaves will be pressed by the weight of the loaves. Instead of using depressions in the surface of the flights to produce the identifying marks, small perforations, suitably arranged, may be used.

By this means a slightly raised distinguishing character, will be formed on each loaf of "bottom bread" and the color of such character will be slightly darker than the body of the loaf.

This furnishes a very simple and effective means of indicating the source of any particular loaf of "bottom bread" which heretofore has been commonly indicated by means of labels, the preparation and application of which increase the expense or cost of production and which are frequently detached, thus permitting substitution of one baker's product for that of another.

Means somewhat similar to that described for marking "bottom bread" have been used in connection with baking "pan bread" but so far as I am aware it is new to provide the flights of the oven conveyor with depressions or perforations which will produce identification markings on loaves of "bottom bread."

The described means for marking "bottom bread" will not in any manner interfere with the positioning of pans on the conveyor as there is no projection from the surface of the flights.

As shown the form of the flights of the conveyor is such that a substantially continuous metal surface is provided throughout the length of the operative, upper, run of the conveyor on which the articles being baked are supported, and the heat for baking such articles is provided by heating elements arranged respectively above and below such operative run of the conveyor.

For purposes of illustration I have shown such heating elements in the form of gas burners 7, 8, the supply pipes 9, 10 of which extend through a side wall of the oven and are connected to suitable mains, illustrated diagrammatically only in Figure 1.

To prevent direct contact of the products of combustion from the upper burners 7 with the articles being baked and resting upon the conveyor as before described, baffle means 12 are preferably provided and the space or chamber within which said upper burners 7 are positioned is provided with suitable vents or means for permitting the escape of the products of combustion therefrom.

Adjacent the inner edges of the track rails 6 are positioned shields 14, 15 which extend longitudinally of the oven chamber and project above and below the roller supporting flange of the track rails. These shields extend upwardly substantially to the lower surface of the flights of the conveyor, the flanges at the forward and rear ends of said flights being cut away at the sides of the conveyor, and, therefore, obstruct the direct passage of heat from the lower burners 8 to the space above the conveyor around the side edges of the latter.

To further protect the articles on the conveyor adjacent the side edges thereof from becoming excessively heated, a body of insulation 16 is interposed between the shields 14, 15 and inner walls of the oven chamber below the roller supporting flange of the track rails 6. The shields 14, 15, may be secured to the vertical member of the track rails.

By this arrangement it will be seen that all of the articles supported on the conveyor, throughout the width thereof, will be uniformly heated, receiving only such heat from the lower heating elements 8 as is transmitted through the bodies of the conveyor flights. Such an arrangement has been found to be very effective in protecting the articles adjacent the side edges of the conveyor from being overbaked and the merchantable proportion of articles baked is materially increased over that obtained when means such as the shields 14, 15 and insulation 16 are not provided.

The articles delivered through the outlet 4 of the baking chamber will be deposited upon a suitable table 20 on which the contents of the pans in which the bread, for example, has been baked, will be emptied and according to the present invention the emptied pans will be placed upon an endless conveyor supported above the oven and returned to a position, beyond the inlet of the oven, to be again loaded.

This empty pan conveyor is shown as being carried by a suitable track supported by hangers 21 attached to the ceiling of the room in which the oven is located and the ends of which track are directed downward so that the pans may be readily placed thereon from the table 20 and at the other end the empty pans will be discharged onto a table 22 from which they can be loaded and placed in suitable holders 23 to be moved to a "proof chamber" 24. From the latter the loaded pans are passed through the inlet 3 of the baking chamber and deposited on the adjacent conveyor therein in any suitable manner.

The conveyor for returning the empty pans, above referred to, is composed of parallel chains mounted on suitable sprockets carried by the frame supported by the hangers 21 and the transverse members of such conveyor are of angle-iron, as shown. These transverse angle bar members of the conveyor are so positioned that at regular intervals throughout the length of the conveyor, a flange 25 projects outward from the supporting surface of the conveyor instead of inward therefrom as do the intermediate members. These outwardly projecting elements 25 constitute abutments against which the end walls of the pans 30 can rest while being carried up the incline from adjacent the table 20 to the upper run of the pan conveyor.

The pan conveyor is, as shown particularly in Figure 2, preferably of substantially one half the width of the conveyor in the baking chamber and is preferably driven by suitable means at a speed twice that at which the oven conveyor travels. The speed of travel of the emptied pans from adjacent the table 20 is such that the pans will be properly cooled and be in condition to be again loaded after being delivered at the discharge table 22.

As is customary in baking "pan bread" the pans are shown as arranged in groups or nests, each nest commonly including four or five pans according to the size of loaves being baked. Ordinarily the oven conveyor will be of a width to accommodate four of such groups or nests and an attendant at the table 20 can easily simultaneously empty two of such nests and place the emptied pans on the pan conveyor.

As before described, one of the features of the present invention is a means for feeding "bottom bread" into the baking chamber.

As shown, this feeding attachment is mounted on a portable frame 40 supported by suitable castors 41 and positioned between the table at the discharge end of the "proof chamber" 24 and the inlet to the baking chamber.

On the frame 40 is mounted a roll 42, to the shaft of which is connected a sprocket 43 which is adapted to be connected by a chain 44 with a sprocket on the shaft of the supporting roll for the oven conveyor adjacent the inlet 3. This connection insures that the roll 42 will be rotated at the same speed as that of the oven conveyor. An endless belt 45 is supported by the roll 42, and a roll 46 carried in bearings mounted on the frame 40 and adapted to be projected through the oven inlet 3 into a position adjacent the conveyor therein when in use.

The shaft of the roll 46 is mounted in bearings 47 which connect the adjacent ends of two plate-like arms 50, 51.

The plate-like arm 50 is supported by a rocking shaft 52 and extends throughout the width of the upper section of the endless belt 45. The plate-like arm 51 forms a support for the lower section of the endless belt 45 and its free edge rests upon the portable frame 40. By this arrangement it is possible by moving the portable frame 40 away from the oven and rocking the shaft 52, to swing the arms 50, 51 upward so that the feeder will occupy a minimum amount of space when in inoperative position. The endless belt 45 being of flexible material will not interfere with movement of the arms 50, 51 and roller 46 as indicated by the curved arrows in Figure 4.

As shown, an angle-iron 60 extends across the lower face of the arm 50 at the free end thereof and to this angle-iron is secured an additional bearing 61 for the shaft of the roll 46. To insure that there will be no relative movement between the feeder supporting frame 40 and the conveyor in the baking chamber when the parts are in position for use, means such as hooks 70 may be provided for connecting the frame 40 with suitable eyes in the end wall of the oven.

Instead of employing the roller 46 as a guide for the end of the feed belt 45 within the oven chamber a bead 62 may be provided on the face of the angle-iron 60. This arrangement will bring the upper surface of the end of the feed belt within the oven relatively close to the oven conveyor so that the loaves will move but a short distance vertically in passing from the feeder to said conveyor.

It is believed that the operation and advantages of the improvements will be readily understood from the foregoing description and the drawings.

In the drawings many of the parts are shown more or less diagrammatically. For example in Figure 1 there is illustrated in outline merely, means for supplying the burners with gas.

It will be understood that there can be considerable modification of any of the details shown without departing from the invention. Unless specifically referred to in the appended claims the invention is not intended to be limited to the exact form of any of the parts shown and the drawings are to be considered as illustrative rather than restrictive of the invention.

What I claim is:

1. The combination with a baker's oven having inlet and outlet openings at opposite ends and provided interiorly with an endless conveyor for transporting dough containing pans between said openings, of means for returning pans from adjacent the oven outlet to the inlet end of the oven comprising an endless conveyor supported to travel over the top of the oven and having a downwardly deflected section at the outlet end of the oven, the conveyor being provided at intervals with transversely extending projections adapted to engage the pans to carry the latter upward to the plane of the operative run of the conveyor.

2. The combination with a baker's oven having inlet and outlet openings at opposite ends and provided interiorly with an endless conveyor for transporting dough containing pans between said openings, of means for returning pans from adjacent the oven outlet to the inlet end of the oven comprising an endless conveyor formed of parallel sprocket chains and connecting bars, certain of said bars, at regular spaced points throughout the length of the conveyor, being of angle form in cross section and so positioned as to provide abutments for the pans projecting outward from the supporting plane of the conveyor.

3. The combination with a baker's oven having inlet and outlet openings at opposite ends and provided interiorly with an endless conveyor for transporting dough containing pans between said openings, of means for returning the pans from adjacent the oven outlet to the inlet end of the oven comprising an endless conveyor formed of parallel sprocket chains and connecting bars of angle form in cross section, certain of said bars, at regular spaced points throughout the length of the conveyor, being positioned reversely to the intermediate bars to provide abutments for the pans projecting outward from the supporting plane of the conveyor.

4. In a baker's oven, the combination of a baking chamber having inlet and outlet openings at opposite ends and provided interiorly with an endless conveyor for transporting articles to be baked between said openings, superposed tracks supporting the conveyor, heating means positioned above the conveyor and between the upper and lower sections thereof, shields extending longitudinally of the upper track for the conveyor, and projecting above and below the conveyor supporting surface of said track, for obstructing the direct passage of heat from the lower heating means to the space above the conveyor past the edges of the upper section of the conveyor, and a body of heat insulation interposed between said shields and the adjacent side walls of the baking chamber beneath the upper track.

5. In a baker's oven, the combination of a baking chamber provided at opposite ends with inlet and outlet openings and having the inner faces of its side walls and top formed of metal, an endless conveyor for transporting articles to be baked through said chamber, rails for supporting the conveyor arranged adjacent the side walls of the chamber, heating means positioned above the conveyor and between the upper and lower sections thereof, means interposed between the upper heating means and the conveyor for protecting articles on the upper section of the conveyor from the direct action of said heating means, and means arranged below the upper section of the conveyor for obstructing the direct passage of heat from the lower heating means to the space above the conveyor past the side edges of the upper section of the conveyor.

6. The combination with a baker's oven having inlet and outlet openings and provided interiorly with an endless conveyor for transporting articles to be baked between said openings, of means for feeding articles to the oven comprising a portable support adapted to be positioned adjacent the oven inlet, and an endless feed band mounted on said support and extending beyond one end thereof, whereby it may be projected through the oven inlet and overlie a portion of the conveyor within the oven, and means for driving said feed band from the oven conveyor.

7. The combination with a baker's oven having inlet and outlet openings and provided interiorly with an endless conveyor for transporting articles to be baked between said openings, of means for feeding articles to the oven comprising a portable support adapted to be positioned adjacent the oven inlet, a band roll mounted in bearings on said support, means for positively rotating said roll, arms mounted on said support and extending beyond one end thereof, a guide for an endless band mounted on said support so that it may be projected through the inlet opening of the oven into a position to permit the band to deliver to the upper surface of the conveyor therein, and an endless band supported by said roll and guide.

8. The combination with a baker's oven having inlet and outlet openings and provided interiorly with an endless conveyor for transporting articles to be baked between said openings, of means for feeding articles to the oven comprising a portable support adapted to be positioned adjacent the oven inlet, a band roll mounted in bearings on said support, means for positively rotating said roll, arms pivotally mounted on said support and extending beyond one end thereof, a second roll mounted in bearings carried by said arms, whereby it may be projected through the inlet opening of the oven into a position over the adjacent end of the conveyor therein, and an endless band supported by said rolls, said band permitting the said arms to be rocked about their pivotal connection with the support.

9. The combination with a baker's oven having inlet and outlet openings and provided interiorly with an endless conveyor for transporting articles to be baked between said openings, of means for feeding articles to the oven comprising a portable support adapted to be positioned adjacent the oven inlet, a band roll mounted in bearings on said support, means for positively rotating said roll, a plate-like arm mounted on said support and extending beyond one end thereof, a second plate-like arm beneath the first said arm having one end resting upon the portable support, bearing blocks connected to the ends of both said plate-like arms remote from the portable support, a second roll mounted in bearings in said blocks, whereby it may be projected through the inlet opening of the oven into a position over the adjacent end of the conveyor therein, and an endless band supported by said rolls, the lower section of the band extending between said plate-like arms.

10. The combination with a baker's oven having inlet and outlet openings and provided interiorly with an endless conveyor for transporting articles to be baked between said openings, of means for feeding articles to the oven comprising a portable support adapted to be positioned adjacent the oven inlet, a band roll mounted in bearings on said support, means for positively rotating said roll, a plate-like arm mounted to rock about a horizontal axis on said support and extending beyond one end thereof, a second plate-like arm beneath the first said arm having one end resting upon the portable support, bearing blocks connected to the ends of both said plate-like arms remote from the portable support, a second roll mounted in bearings in said blocks, whereby it may be projected through the inlet opening of the oven into a position above the adjacent end of the conveyor therein, and an endless band supported by said rolls, the lower section of the band extending between said plate-like arms.

11. The combination with a baker's oven having inlet and outlet openings and provided interiorly with an endless conveyor for transporting articles to be baked between said openings, of means for feeding articles to the oven comprising a portable support adapted to be positioned adjacent the oven inlet, a band roll mounted in bearings on said support, means for positively rotating said roll, a plate-like arm mounted on said support and extending beyond one end thereof, a second plate-like arm beneath the first said arm having one end resting upon the portable support, bearing blocks connected to the ends of both said plate-like arms remote from the portable support, a second roll mounted in bearings in said blocks, whereby it may be projected through the inlet opening of the oven into a position above the adjacent end of the conveyor therein, an additional bearing for the last said roll mounted on the first said plate-like arm and engaging the roll shaft at an intermediate point in its length, and an endless band supported by said rolls.

12. The combination with a baker's oven having inlet and outlet openings and provided interiorly with an endless conveyor for transporting articles to be baked between said openings, of means for feeding articles to the oven comprising a portable support adapted to be positioned adjacent the oven inlet, a band roll mounted in bearings on said support, means for positively rotating said roll, a band guide supported beyond one end of the portable support, whereby it may be projected through the oven inlet to a position over the adjacent end of the oven conveyor, and an endless band supported by said roll and guide.

In testimony whereof I have hereunto set my hand.

CORRY B. COMSTOCK.